US008485810B2

(12) United States Patent
Mathy, Jr. et al.

(10) Patent No.: US 8,485,810 B2
(45) Date of Patent: Jul. 16, 2013

(54) BLOW MOLDING APPARATUS

(75) Inventors: John M. Mathy, Jr., Stewartstown, PA (US); David N. Fiorani, Jacobus, PA (US)

(73) Assignee: Graham Engineering Corporation, York, PA (US)

( * ) Notice: Subject to any disclaimer, the term of this patent is extended or adjusted under 35 U.S.C. 154(b) by 351 days.

(21) Appl. No.: 12/898,832

(22) Filed: Oct. 6, 2010

(65) Prior Publication Data

US 2012/0086156 A1 Apr. 12, 2012

(51) Int. Cl.
*B29C 49/36* (2006.01)
*B29C 49/56* (2006.01)

(52) U.S. Cl.
USPC .............................. 425/182; 425/540; 425/541

(58) Field of Classification Search
CPC ....................................................... B29C 49/36
USPC .................. 425/182, 193, 195, 522, 540, 541
See application file for complete search history.

(56) References Cited

U.S. PATENT DOCUMENTS

| | | | |
|---|---|---|---|
| 2,840,349 A | 6/1958 | Raymond | |
| 3,310,834 A * | 3/1967 | Simpson et al. | 425/152 |
| 3,764,250 A | 10/1973 | Waterloo | |
| 4,698,012 A | 10/1987 | Shelby et al. | |
| 4,998,873 A * | 3/1991 | Martin et al. | 425/541 |
| 5,240,718 A | 8/1993 | Young et al. | |
| 5,244,610 A | 9/1993 | Kitzmiller | |
| 5,681,596 A * | 10/1997 | Mills et al. | 425/540 |
| 5,698,241 A | 12/1997 | Kitzmiller | |
| 5,705,121 A * | 1/1998 | Allred, Jr. | 264/543 |
| 6,773,251 B2 | 8/2004 | Nightingale | |
| 7,316,799 B2 | 1/2008 | Crider et al. | |
| 7,611,657 B2 | 11/2009 | Klinedinst et al. | |
| 7,638,082 B2 | 12/2009 | Mattice et al. | |
| 2010/0230868 A1 | 9/2010 | Oles | |

FOREIGN PATENT DOCUMENTS

| | | | |
|---|---|---|---|
| FR | 1266061 A | | 7/1961 |
| JP | 06143395 A | * | 5/1994 |
| WO | 2010105023 A2 | | 9/2010 |

OTHER PUBLICATIONS

International Search Report and Written Opinion received in PCT/US2011/053830, mailed Feb. 13, 2012.

* cited by examiner

*Primary Examiner* — Robert B Davis
(74) *Attorney, Agent, or Firm* — McNees Wallace & Nurick LLC

(57) ABSTRACT

The invention is directed a rotary molding machine having a wheel mounted for rotation on a pair of shafts positioned along the rotational axis of the wheel. A first shaft cooperates with a first turntable of the wheel and a second shaft cooperates with a second turntable. The first and second turntables extend transversely to the rotational axis. A plurality of modular mold clamp assemblies are positioned on the wheel, with each modular mold clamp assembly being moveable between an open and a closed position. Each modular mold clamp assembly has mounting areas which are mounted with respective mounting locations each turntable. The modular mold clamp assemblies provide the structure and rigidity between the turntables to help maintain the turntables in position relative to each other.

21 Claims, 13 Drawing Sheets

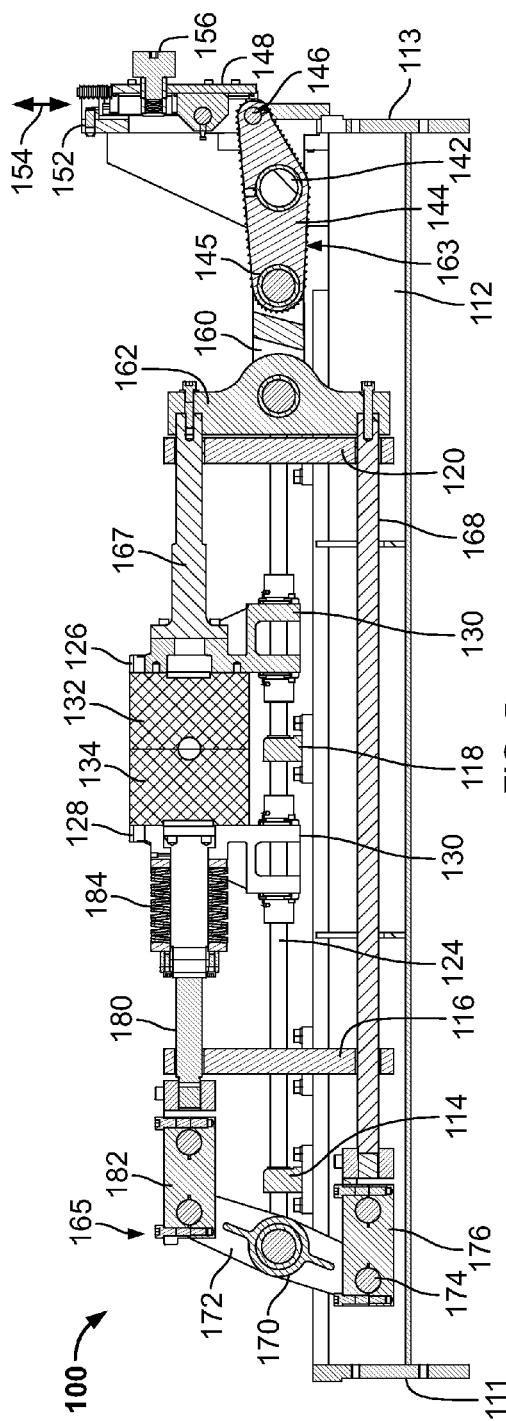
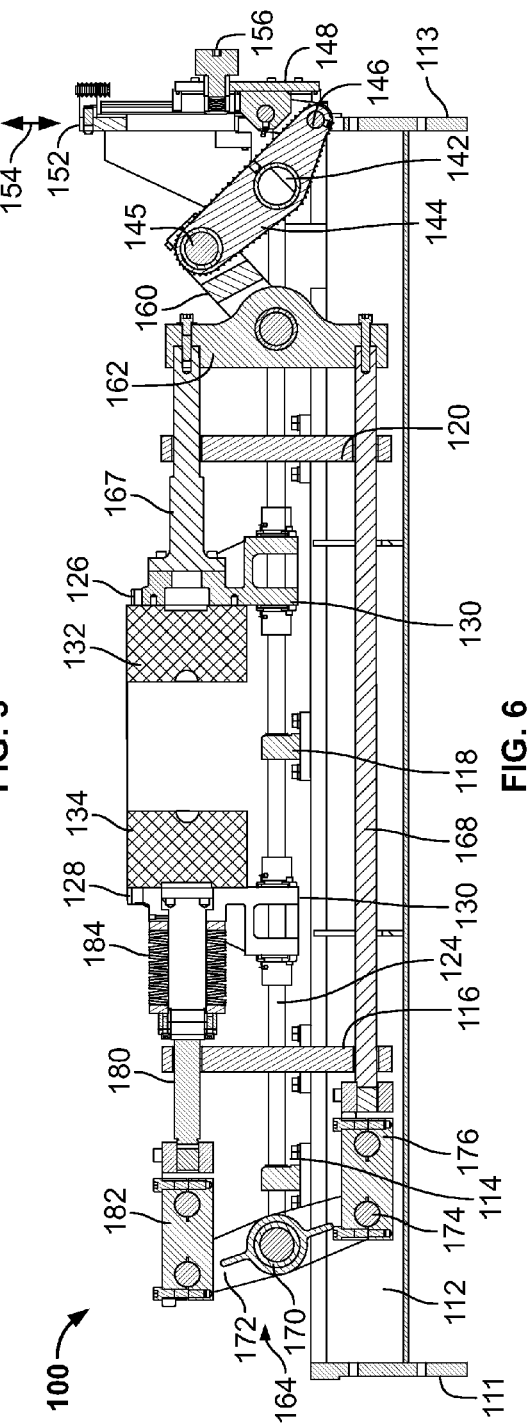
FIG. 5
FIG. 6

BLOW MOLDING APPARATUS

FIELD OF THE INVENTION

The present invention is related to a multi-station blow molding machine or apparatus. In particular, the invention relates to a blow molding machine or apparatus in which the components are modular.

BACKGROUND OF THE INVENTION

Rotary plastic blow molding machines conventionally include a structural frame or wheel mounted on a base for rotation about a horizontal rotational axis. The wheel includes a frame that supports a plurality of mold stations, each of which are mounted around the circumference of the machine, and each of which has a pair of mold supports for mounting a pair of mold portions of a mold. A continuously extruded parison is guided between open mold halves. With rotation, the molds close on the parison, the parison is blown, the molds open to eject containers, and the cycle is repeated. The molds are continuously rotated at high speed to produce containers in high volumes. These machines are expensive to construct and operate. As many as twenty-four or more new molds may be required. Change-over to a different style container is expensive and time-consuming due to the need to build and install a set of new molds on the supports.

One such machine is disclosed in U.S. Pat. No. 3,764,250 issued to Waterloo. Waterloo discloses a blow molding machine which includes a shaft, through which air and fluid pass, which extends through the wheel. A pair of side means are provided, which are parallel to each other and extend transversely to the axis of the shaft. Extending between the side means, in even, circumferentially-spaced relationship to each other, are pairs of similar guide rods, which are firmly secured at the ends thereof, respectively, to the side means. Mounted upon each pair of guide rods is a pair of similar complementary jaws, which are provided with opposing vertical faces against which the mold dies are firmly mounted by appropriate attaching means, such as bolts or the like, not shown, in accordance with conventional practice in blow molding machines. Thus, the basic elements of the wheel are the side means and the guide rods which extend therebetween and are connected firmly thereto. The support of the side means, and other components on the continuous shaft, is an essential feature of the machine.

Because of the supports and shafts required to properly operate the machines, the machines are complicated to manufacture and require significant expertise and time to repair or replace the mold clamp assemblies. It would, therefore, be beneficial to provide a blow molding machine in which the components are more modular, thereby allowing the components to be easily repaired or replaced when a change-over to a different style container is required.

SUMMARY OF THE INVENTION

An object of the invention is to provide a rotary blow molding machine in which the inventory of parts required to accommodate various configurations is minimized, thereby reducing the need to manufacture specific mold clamp assemblies for specific machines.

Another object of the invention is to provide a rotary blow molding machine which is less expensive to manufacture and operate by allowing the same components to be used in various machines, thereby reducing the need to manufacture specific components for specific machines.

Another object of the invention is to provide a modular rotary blow molding machine in which components can be easily removed and replaced with minimal downtime, thereby minimizing the impact to the productivity of the operation.

Another object of the invention is to provide a modular rotary blow molding machine in which components can be easily removed and replaced by maintenance level personnel rather than factory technicians, thereby minimizing the cost.

Another object of the invention is to provide a simplified structure of a rotary molding wheel by using a modular mold clamp assembly which provides the structural support necessary between components of the rotary molding wheel.

Another object of the invention is to provide a modular mold clamp assembly in which the bending moments are not transferred to the components of a rotary molding wheel.

One aspect of the invention is directed to a rotary molding machine having a movable member mounted for rotation on a base about a rotational axis. The movable member has a first component and a second component which is parallel to the first component. The first and second components extend transversely to the rotational axis. A plurality of modular mold clamp assemblies are positioned on the movable member, with each modular mold clamp assembly being moveable between an open and a closed position. Each modular mold clamp assembly has mounting areas which are mounted with respective mounting locations in each component. The modular mold clamp assemblies provide the structure and rigidity between the components to help maintain the components in position relative to each other.

Another aspect of the invention is directed to the rotary molding which has a pair of shafts positioned along the rotational axis of the movable member. The first shaft cooperates with the first component and the second shaft cooperates with the second component.

Another aspect of the invention is directed to a wheel for use in rotary molding machine. The wheel has a first turntable and a second turntable mounted for rotation about a rotational axis. The second turntable is parallel to the first turntable. The first and second turntables extend transversely to the rotational axis. A plurality of modular mold clamp assemblies are provided on the turntable. Each modular mold clamp assembly is moveable between an open and a closed position, and has mounting areas which are mounted with respective mounting locations of each turntable. The modular mold clamp assemblies provide the structure and rigidity between the turntables to help maintain the turntables in position relative to each other.

Another aspect of the invention is directed to a method of molding parts in the blow molding apparatus which allows for productivity to be increased. The modular mold clamp assemblies are inserted into the movable member. The movable member is rotated about a rotational axis of the base. The components of the movable member are supported through the modular clamp assemblies. Mold halves, which are supported by the modular mold clamp assemblies, are clamped around extruded material. The material is cured in the mold halves and the parts are ejected from the mold halves. This allows the productivity of the molding apparatus to be increased, as the repair and maintenance downtime of the blow molding apparatus is minimized.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 5 is a cross-sectional view of the modular mold clamp assembly of FIG. 3, taken along the longitudinal axis of the modular mold clamp assembly.

FIG. 6 is a cross-sectional view of the modular mold clamp assembly of FIG. 4 taken along the horizontal axis of the modular mold clamp assembly.

DETAILED DESCRIPTION OF THE INVENTION

The rotary blow molding machine described herein is adapted to engage a tubular parison and transform the same into hollow, molded objects, such as containers of various types. As is known in the industry, the parison comprises resin which is homogeniously melted within an extruder of suitable type.

Figure 1:
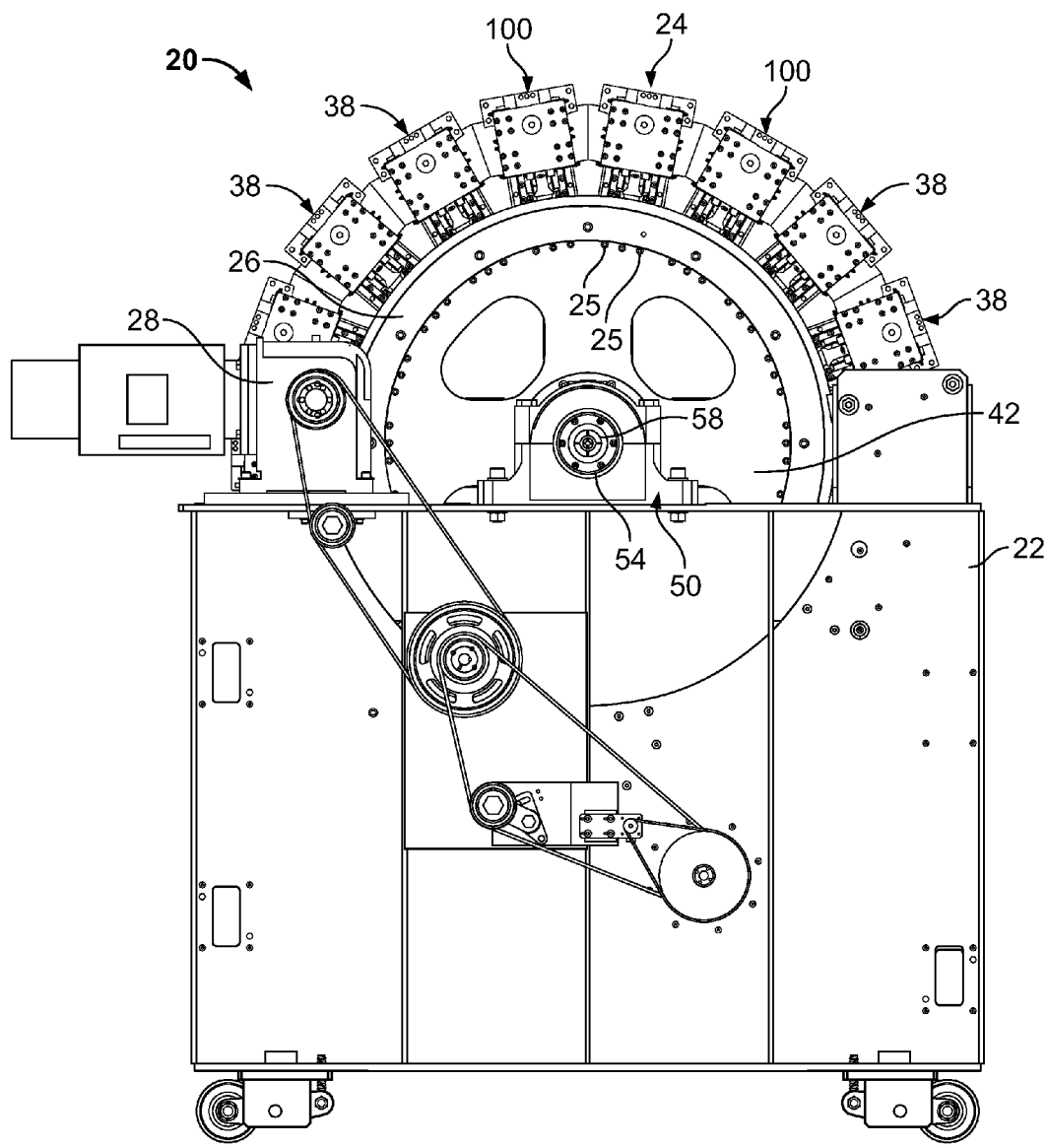
FIG. 1 is a side elevation of an exemplary blow molding machine embodying the principles of the present invention.
Figure 2:
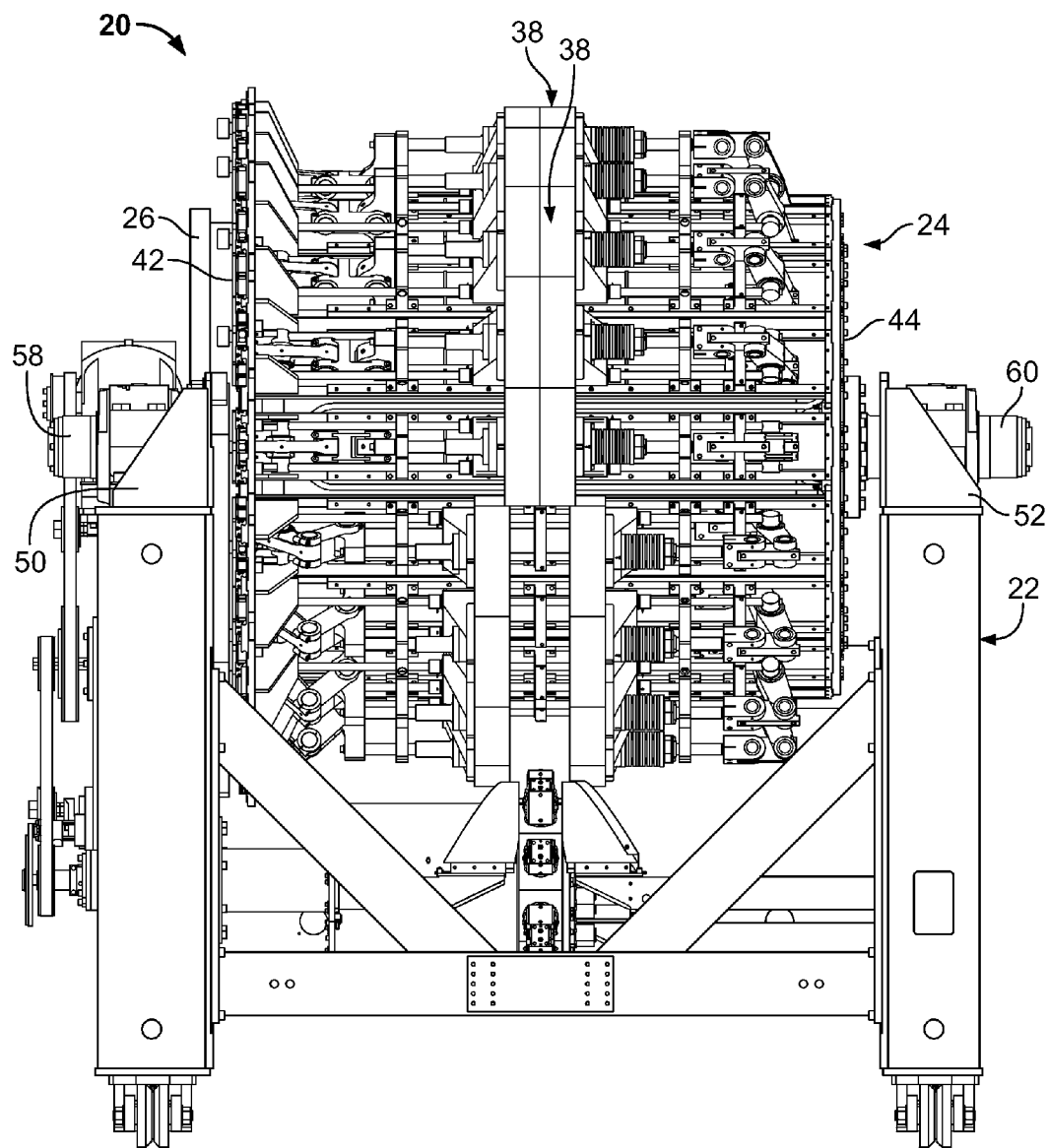
FIG. 2 is a front elevation of the blow molding machine shown in FIG. 1.

Referring now to FIG. 1 and FIG. 2, there is illustrated a plastic blow molding machine shown generally by reference numeral 20. The blow molding machine 20 includes a base 22 and a movable member or wheel 24 mounted on the base for rotation thereon about a rotational axis A. The movable member 24 may be in the form of a wheel or other such configurations which are rotatable about the rotational axis. As illustrated, the blow molding machine includes a ring gear or drive gear 26 driven by a drive mechanism 28. The ring gear 26 is mounted to turntable 42 and rotates the wheel 24.

As best shown in FIG. 1, the plastic blow molding machine 20 includes a plurality of blow molding stations 38 mounted on the wheel 24 for rotation therewith about the rotational axis A. As shown, the wheel 24 has eighteen mold stations 38, provided between components or turntables 42, 44 of the wheel 24, although other configurations are included within the scope of the claims. The components 42, 44 may be in the form of turntables or other such configurations which are rotatable about the rotational axis.

Figure 14:
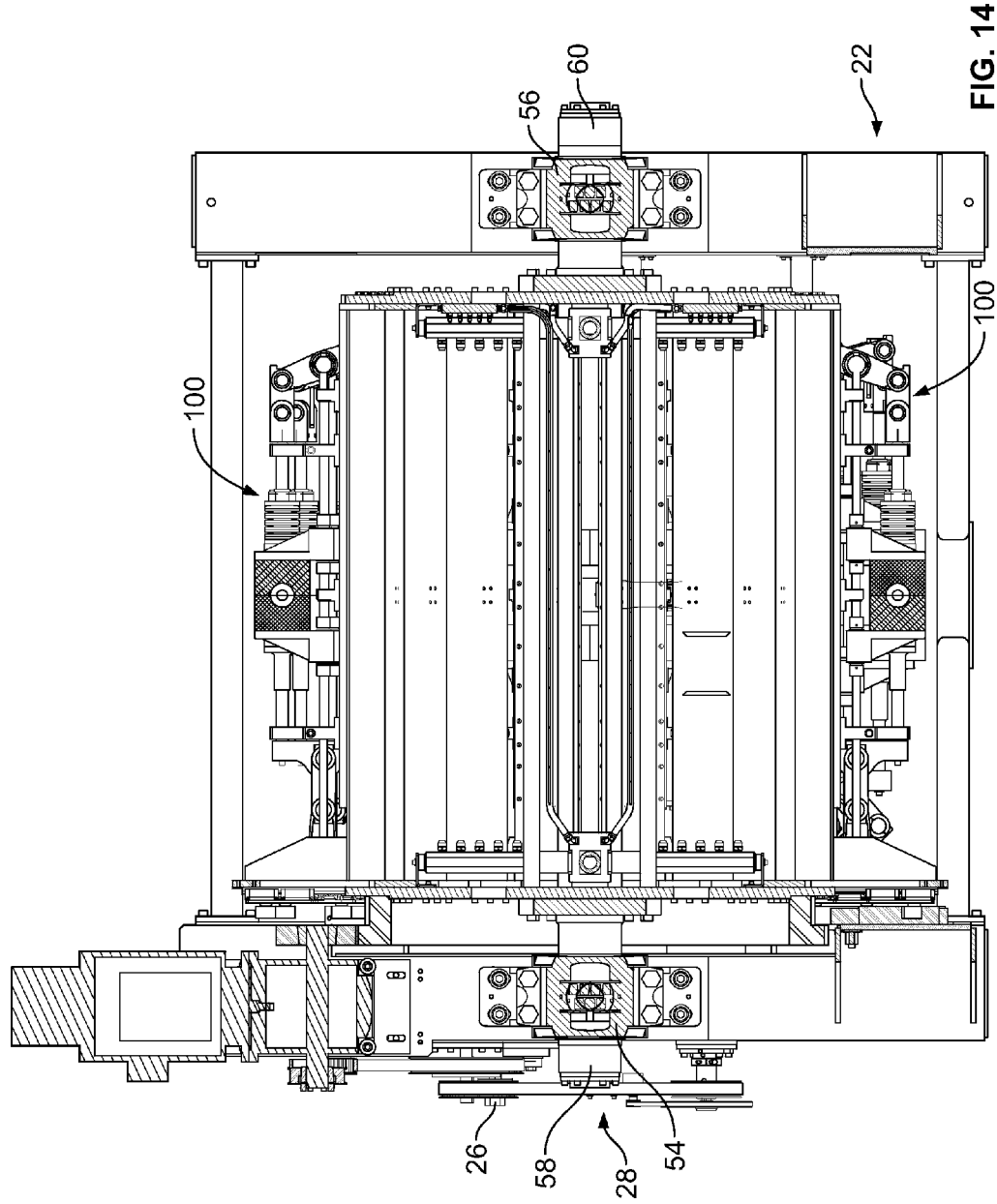
FIG. 14 is an enlarged top plan view of the power means of the blow molding machine, certain parts of the blow molding machine being shown fragmentarily in phantom to illustrate operative relationship between the blow molding machine and the power means.

The turntables 42, 44 of wheel 24 are mounted for rotation within a substantially vertical plane transverse to the axis of the base 22. For this purpose, base 22 supports, in transversely-spaced relationship, a pair of vertical standards 50, 52, which are heavy castings or the like, firmly secured, at the lower ends thereof, directly to base 22 by appropriate means. The upper ends of the standards 50, 52 respectively support bearings 54, 56 (FIG. 14), from which the main supporting stub shafts 58, 60 extend. The outer ends of the stub shafts 58, 60 project beyond the outer ends of the bearing, respectively, for the attachment of rotary joints thereto through which air and fluid respectively pass. The shafts 58, 60 are tubular to accommodate certain conduits which are described in detail hereinafter. As shown in FIG. 2, the stub shafts 58, 60 do not extend into the open space provided between the turntables 42, 44.

The turntables 42, 44 of wheel 24 are fixed to and carried by respective shafts 58, 60. The turntables 42, 44 are parallel to each other and extend transversely to the axis of the shafts 58, 60. In an embodiment, the turntable 42 comprises a manifold for gaseous fluid, preferably air, removably attached to the turntable 42. The manifold transmits the gaseous fluid from conduits within the shaft 58 to one of the mold halves by which a parison needle is supported, and relative to which it is movable to and from the mold cavity by means described hereinafter. In another embodiment, the turntable 42 may be a plate having the strength characteristics required, and the gaseous fluid may be transmitted through conduits within the shaft 58 to the mold halves by means of tubing or the like.

In an embodiment, the turntable 44 comprises a manifold for liquid, preferably water, removably attached to the turntable 44. The manifold transmits the liquid from conduits within the shaft 60 to one of the mold halves. In another embodiment, the turntable 44 may be a plate having the strength characteristics required, and the liquid may be transmitted through conduits within the shaft 60 to the mold halves by means of tubing or the like.

Each of the turntables 42, 44 is prevented from inward axial movement and disengagement from respective stub shafts 58, 60 by any known suitable means, such as a lock ring. Extending between turntables 42, 44, at each mold station 38 and in even, circumferentially-spaced relationship to each other, are the mold clamp assemblies 100, which are firmly secured at the ends thereof, respectively, to the turntables 42, 44.

The circumferentially-spaced arrangement of the various mold clamp assemblies 100 is best illustrated in FIG. 1. In order that the illustration in FIG. 2 might be simplified for clarity of concept, only several of the mold clamp assemblies 100 are illustrated therein, whereas the intervening mold clamp assemblies 100 have been omitted. It is to be understood, however, that the machine shown in FIG. 2 embodies a full complement of the mold clamp assemblies 100 at each molding station 38, such as shown in FIG. 1.

Firmly and removably secured to the outer face of the turntable 42 is the ring gear 26 of extensive diameter, as can readily be seen from FIGS. 1 and 2. The ring gear 26 and drive mechanism 28 generally operate at a predetermined speed which is capable of adjustment by conventional means.

Referring to FIGS. 3-10, an exemplary embodiment of mold clamp assembly 100 is shown, the modular mold clamp assembly 100 having a frame 110. The frame 110 has a base member 112 and two oppositely-facing end members 111, 113. The end members 111, 113 extend from either end of the base member 112 in a direction that is essentially transverse to the longitudinal axis of the base member 112. The end members 111, 113 are integrally attached to the base member in any known manner which has the strength characteristics required. Mounting openings 115 are provided on the frame 110 proximate the ends of the base member 112. The openings 115 cooperate with mounting hardware (FIG. 10) to mount the modular mold clamp assembly 100 to mounting openings 25 of the turntables 42, 44 of the wheel 24. The base member 112 and end members 111, 113 are made from any material that has the strength characteristics required to support the components of the modular mold clamp assembly 100 and to provide the structural integrity required to support the radially extending turntables 42, 44 of the wheel 24. The mold clamp assemblies 100 provide the main structural support between the turntables. Small diameter support rods are used to space the turntables 42, 44 and keep the turntables 42, 44 from dishing at the stub shafts 58, 60. This allows the mold clamp assemblies 100 to be fully assembled prior to insertion of the mold clamp assemblies 100 into the blow molding machine 20. The fully assembled mold clamp assemblies 100 are then mounted in the blow molding machine 20 using the hardware described. This modular aspect of the wheel 24 and mold clamp assemblies 100 provides many advantages, as will be more fully described.

Figure 3:
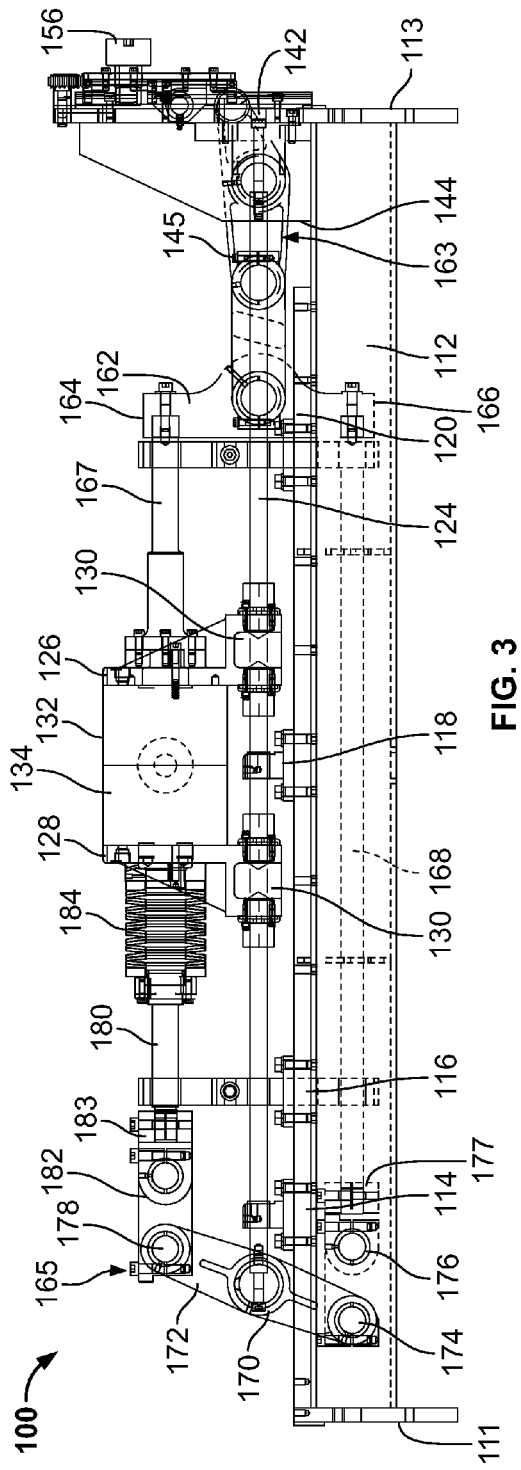
FIG. 3 is a side view of an exemplary embodiment of a modular mold clamp assembly for use in the blow molding machine, the modular mold clamp assembly having molds inserted therein and being shown in the closed position.

Each modular mold clamp assembly 100 includes rods 124 mounted on base member 112 of frame 110. The rods 124 extend essentially parallel to the longitudinal axis of the base member 112. As best shown in FIGS. 3 and 6, rods 124 extend through openings in mounting brackets 114, 116, 118, 120. In the embodiment shown, the mounting brackets 114, 116, 118, 120 are fixed to the base member 112 by bolts or other mounting hardware. Mold platens 126 and 128 are mounted on the rods 124 by slides 130 which permit movement of the platens toward and away from each other during closing and opening of mold halves 132 and 134 mounted on platens 126 and 128, respectively. FIG. 3 illustrates assembly 100 with the mold halves closed.

Figure 9:
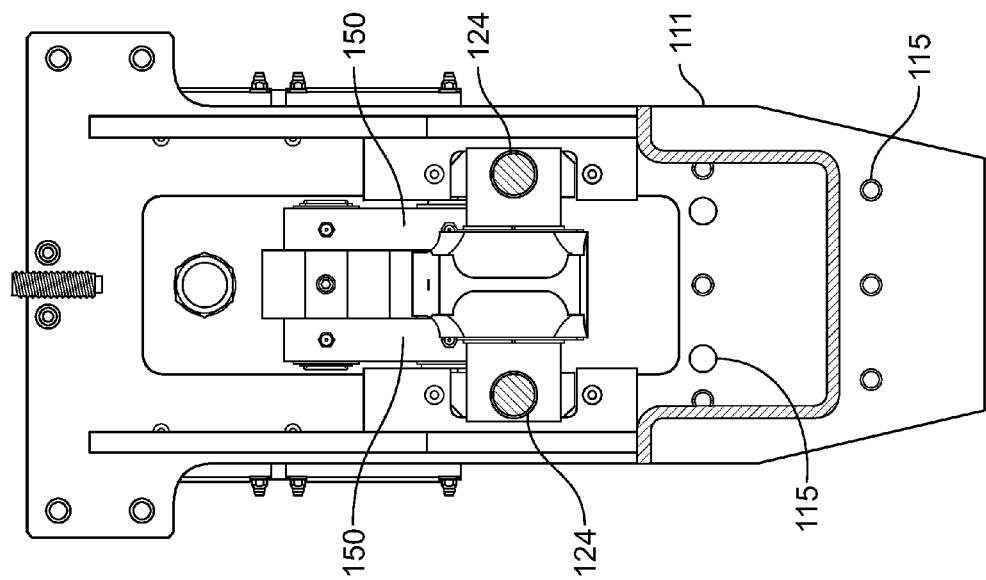
FIG. 9 is a vertical cross-sectional view of the modular mold clamp assembly of FIG. 3, looking toward a first end of the assembly.
Figure 11:
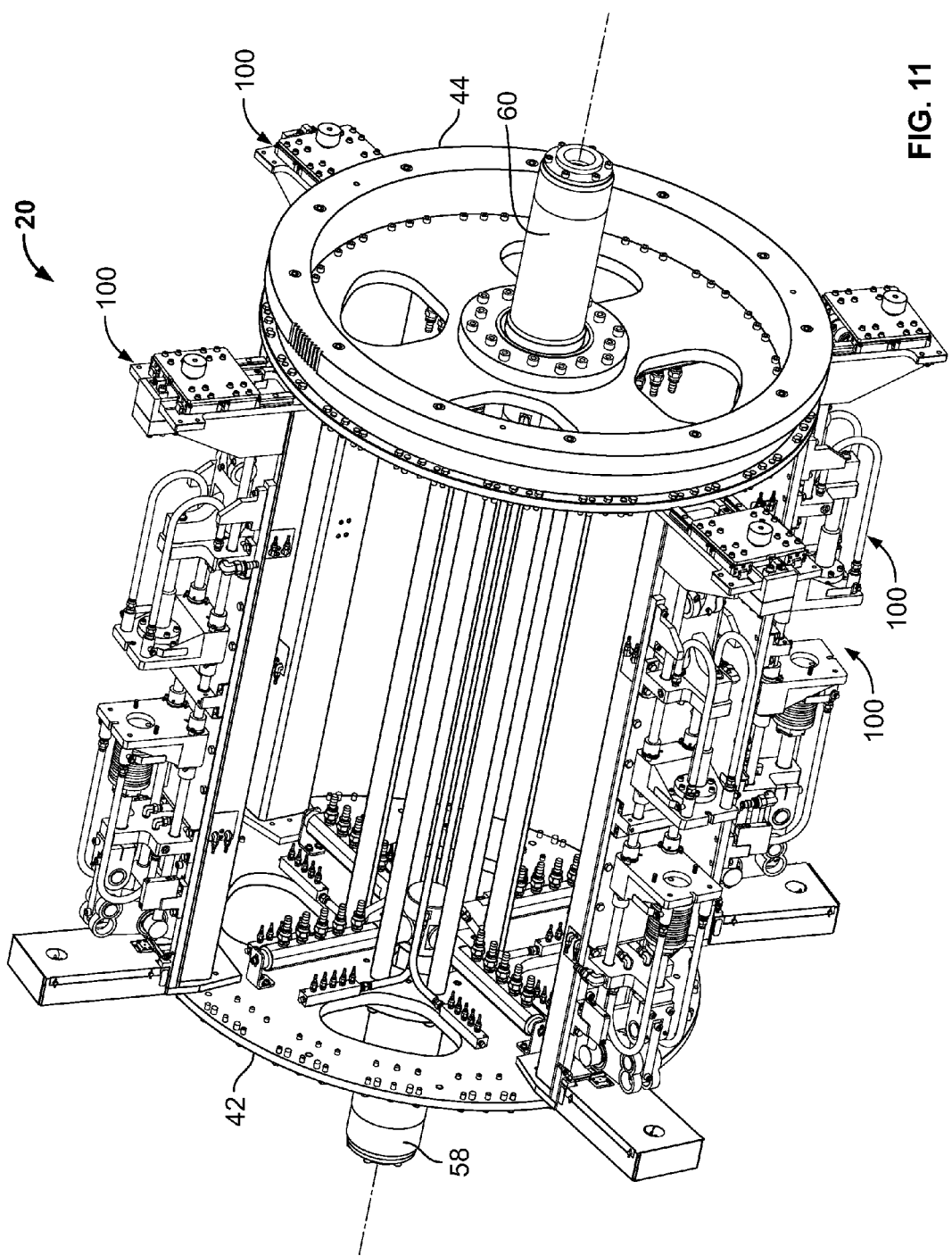
FIG. 11 is a perspective view of a wheel of the blow molding machine with several modular mold clamp assemblies attached thereto, the mold clamp assemblies being shown with no molds positioned therein.
Figure 12:
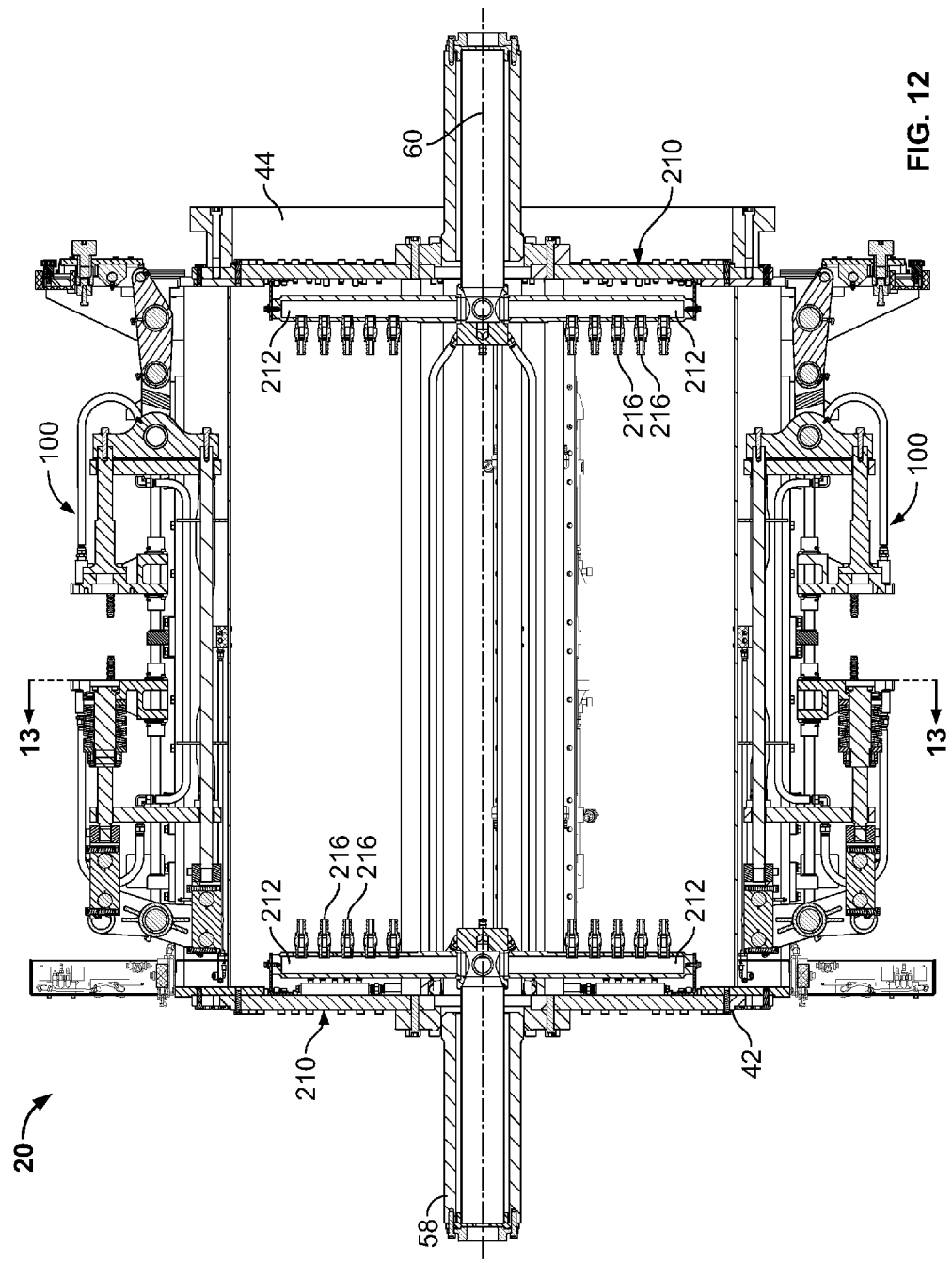
FIG. 12 is a cross-sectional view of the wheel shown in FIG. 11.
Figure 13:
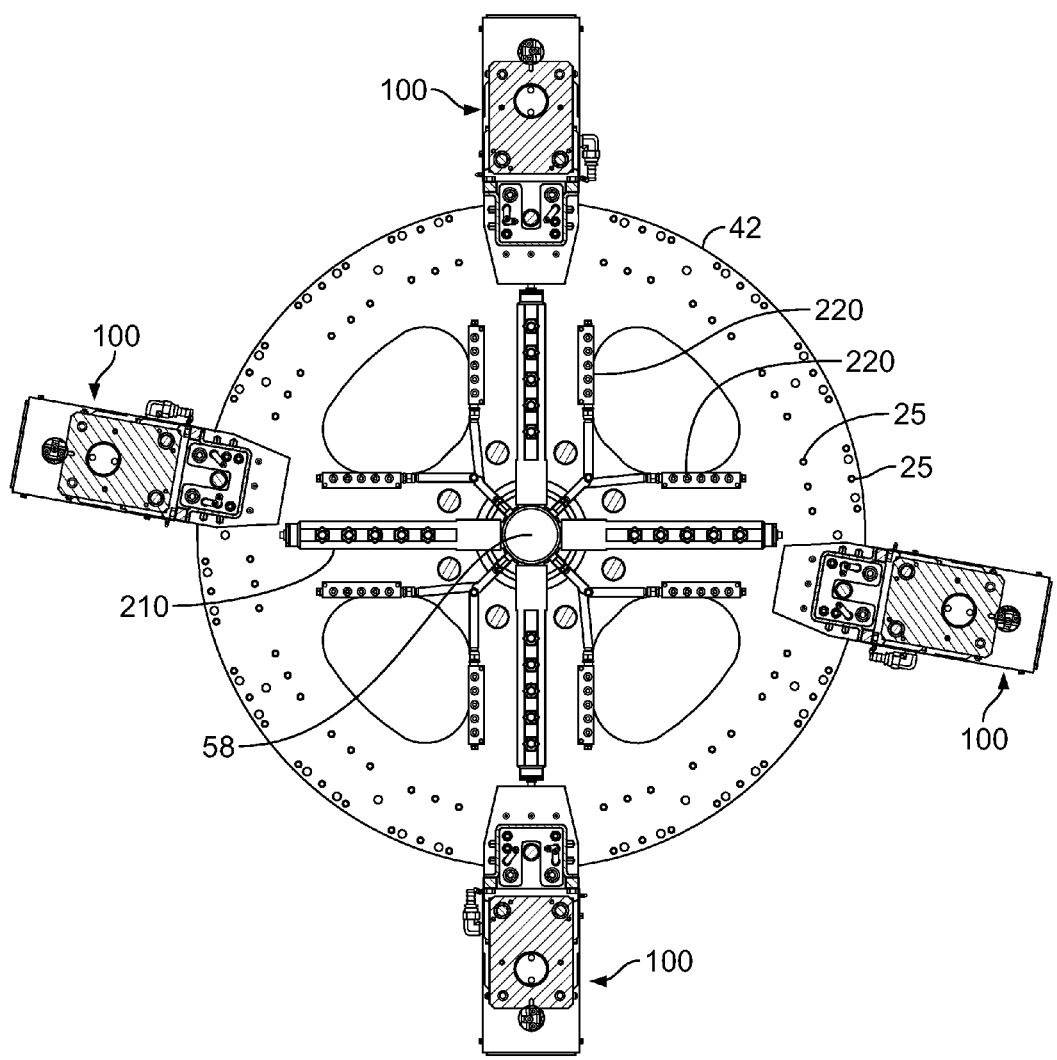
FIG. 13 is a cross-sectional view of the wheel, taken along the line 13-13 of FIG. 12.

Pin 142 extends through a portion of end member 113. The adjacent ends of rods 124 are secured to the pin. Pivot arm 144 is rotatably mounted on pin 142 between the rods 124. The outer end 146 of arm 144 away from the mold halves extends through an opening in end member 113 and is connected to follower slide 148 by links 150 (FIG. 9). The follower slide 148 is mounted on the outside surface of the end wall 113 by slide 152 to permit movement of the car back and forth in the direction of arrow 154, shown in FIGS. 5 and 6. Car 148 carries cam follower roller 156, which extends into circumferential fixed cam slot 196 of the blow molding machine. Rotation of wheel 24 moves follower 156 into and around the cam slot 196 to follower slide 148 inwardly and outwardly and rotate arm 144 between the positions shown in FIGS. 3 and 4.

Shift member 162 is located between mold platen 126 and end member 113. A cylindrical rod 167 extends from an upper end 164 of member 162 and is bolted directly to mold platen 126 so that movement of member 162 toward end member 113 moves the mold platen 126 and mold half 132 toward the end member 113. The lower end 166 of shift member 162 extends from the lower end of bracket 120 and extends below mold halves 132 and 134. The shift member is slidably mounted on rods 124 and 168.

Link 160 is pivotally connected to the inner link end 145 of arm 144 and to mold shift member 162. The pivot connection between link 160 and member 162 is located halfway between the upper end 164 and lower end 166 of member 162 to balance forces. Shift rod 168 is parallel to the longitudinal axis of the base member 112 and extends freely through the base member 112. The shift rod 168 is connected to the lower end 166 of member 162. The link 160 and inner link end 145 of arm 144 form a two-link extendable and retractable drive 163 for opening and closing platens 126, 128 and mold halves 132, 134.

Cross pin 170 is fixedly mounted on the ends of rods 124 extending past platen 128 and mold half 134 and rotatably supports pivot arm 172. The lower end 174 of arm 172 is connected to the adjacent end of shift rod 168 by pivot link 176 and rod end clevis 177. The upper end 178 of arm 172 is connected to mold clamp rod 180 by pivot link 182 and rod end clevis 183. Clamp rod 180 is connected to platen 128 through dished washer spring pack 184. Rod 168, clevis 177, link 176, arm 172 and rod 180 are part of a mold shift mechanism 165 for opening and closing platen 128 and mold half 134. Mechanism 165 is connected to drive 163 through member 162.

Figure 16:
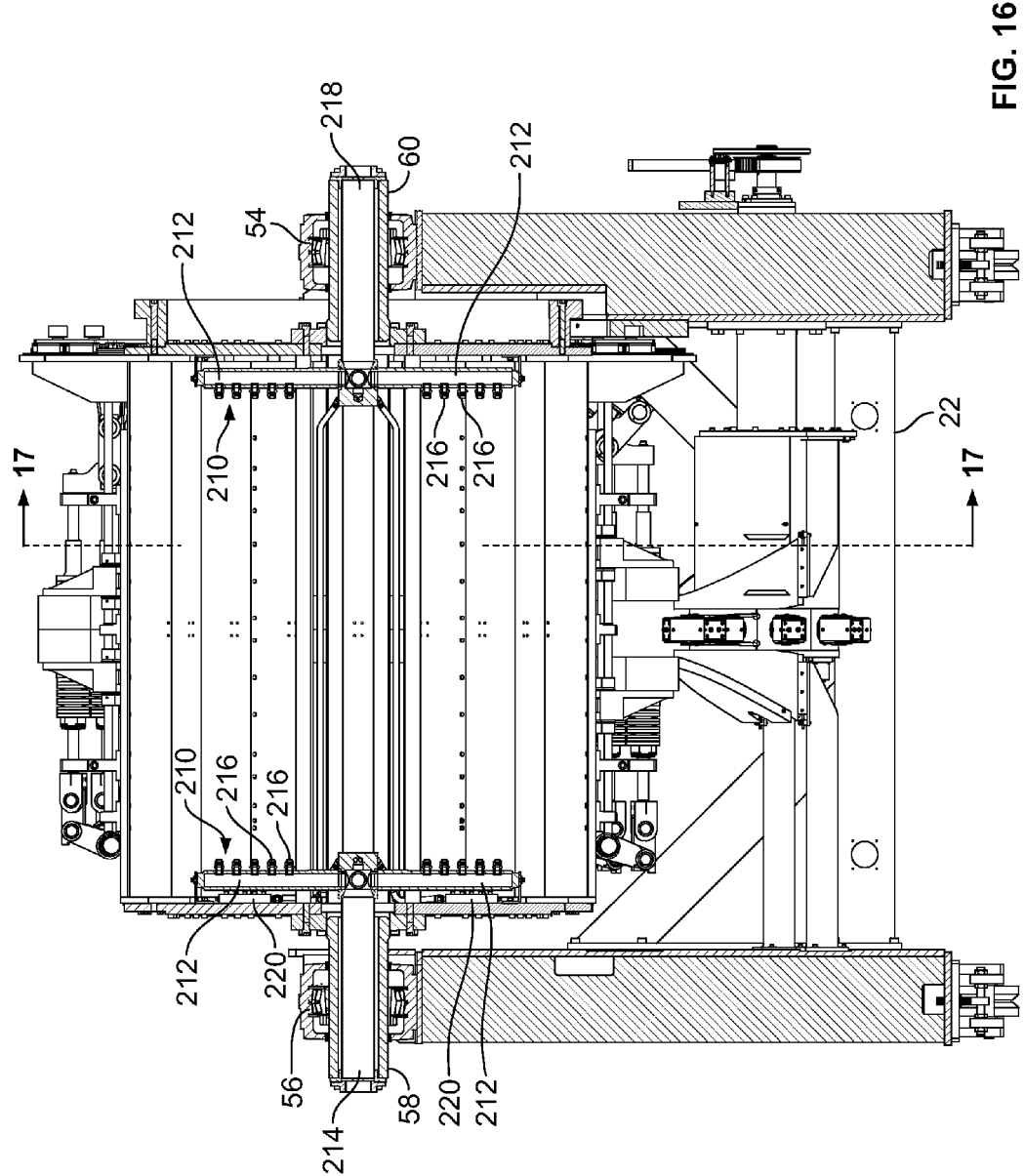
FIG. 16 is a vertical sectional view of the fluid manifold as seen on the line 16-16 of FIG. 17.
Figure 17:
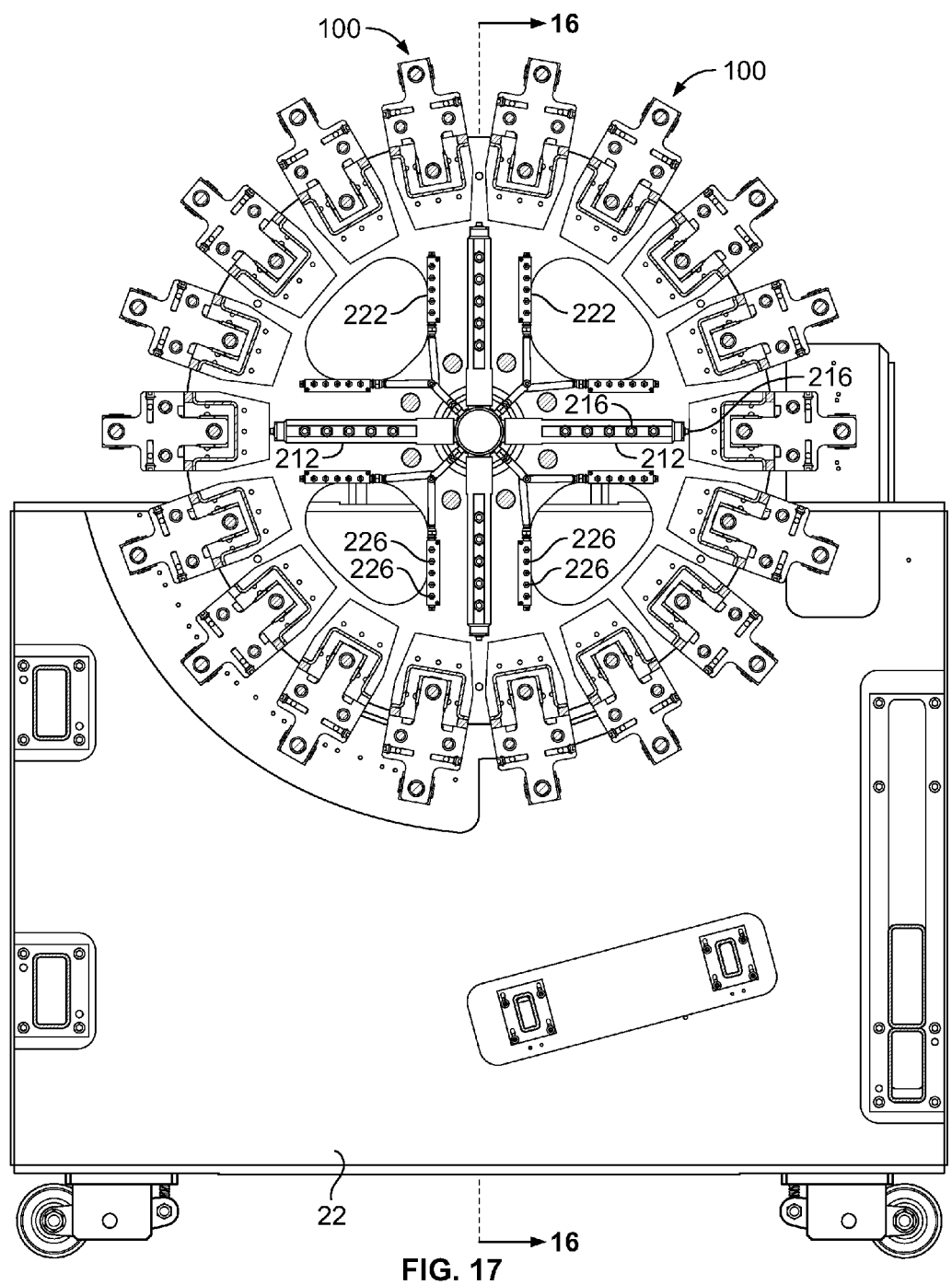
FIG. 17 is a vertical sectional elevation of the fluid manifold shown in FIG. 16 as seen on the line 17-17 of said figure.

In operation, the modular mold clamp assemblies 100 are assembled to the turntable 42, 44 of the wheel 24, as previously described. The assemblies 100 have fluid couplings which are connected via hoses to the respective fluid manifolds 210. The fluid is supplied through the fluid manifolds 210 to cool the mold halves, as is known in the industry. As best shown in FIGS. 16 and 17, fluid manifold 210 located proximate turntable 42 delivers fluid to the assemblies 100, while fluid manifold 210 located proximate turntable 44 draws fluid away from the assemblies 100. Alternatively, the respective manifolds 210 may be reversed or positioned in other locations. The manifolds 210 have four pipes 212 which extend radially outward from and are rotatably mounted on the stub shaft 58. Fluid is delivered to the pipes 212 through a main conduit 214 which extends through the shaft 58. Hoses (not shown) are connected, at one end, to fluid outlets 216 of pipes 212 and, at the opposite end, to assemblies 100. The assemblies 100 are pre-assembled to transport the fluid to the mold halves 132, 134. Similarly, fluid is removed through respective pipes 212 through main conduit 218 which extends through shaft 60. The assemblies 100 are pre-assembled to transport the fluid away from the mold halves 132, 134. As the manifold operates in a known manner, a more detailed description will not be provided.

The assemblies 100 have air couplings which are connected via hoses to the respective air manifolds 220. The air is used to blow air into the mold cavities and to operate the required devices with the container as it is removed from the cavity, both of which are known in the industry. As best shown in FIGS. 16 and 17, air manifold 220 located proximate turntable 42 delivers air to the assemblies 100. Alternatively, the manifold 220 may be positioned on the opposite turntable or in other locations. The manifold 220 has eight assemblies 222 which extend radially outward from and are rotatably mounted on the stub shaft 58. Air is delivered to the assemblies 222 through a main conduit 224 which extends through the shaft 58. Hoses (not shown) are connected, at one end, to air outlets 226 of assemblies 222 and, at the opposite end, to assemblies 100. The assemblies 100 are pre-assembled to transport the air to the mold halves 132, 134. As the manifold operates in a known manner, a more detailed description will not be provided.

Figure 4:
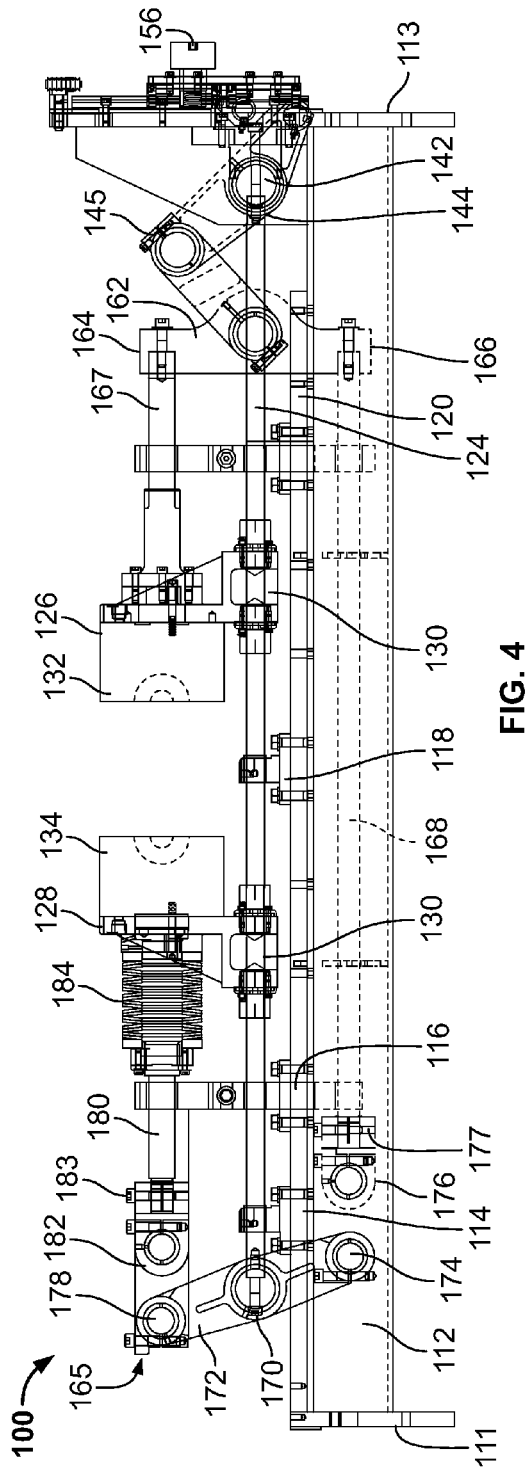
FIG. 4 is a side view of the modular mold clamp assembly, the modular mold clamp assembly having molds inserted therein and being shown in the open position.
Figure 7:
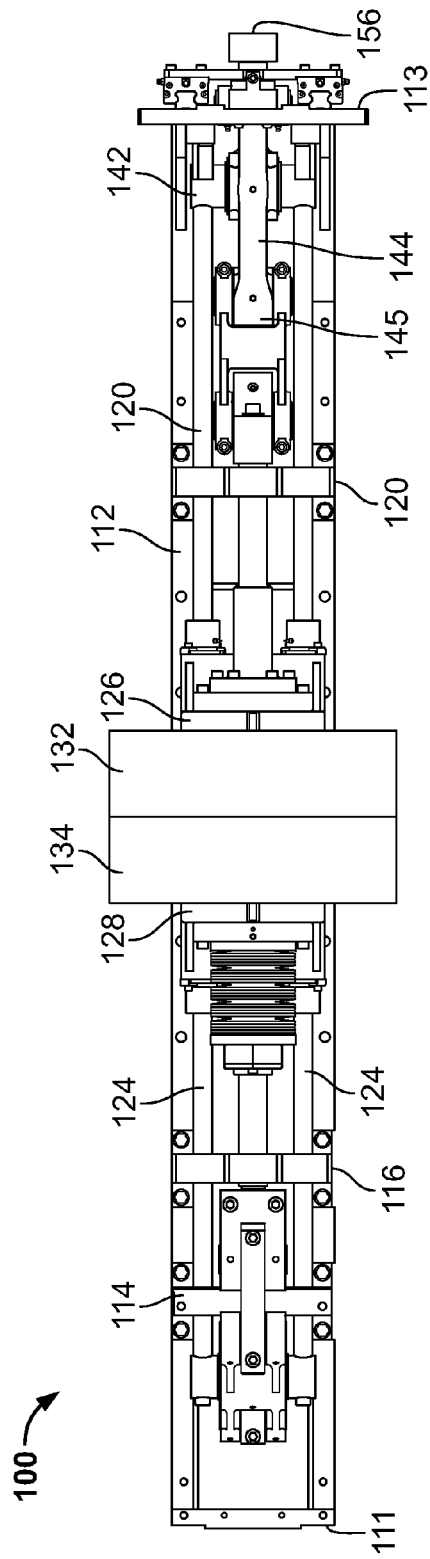
FIG. 7 is a top view of the modular mold clamp assembly of FIG. 3.
Figure 8:
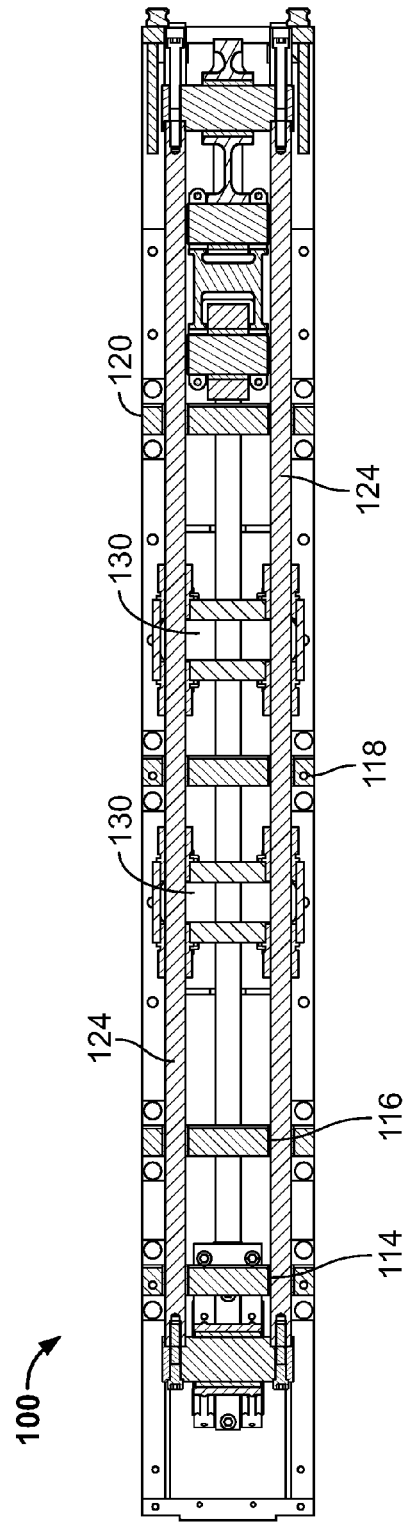
FIG. 8 is a cross-sectional view thru the tie bars of the modular mold clamp assembly of FIG. 3 with the molds removed.
Figure 10:
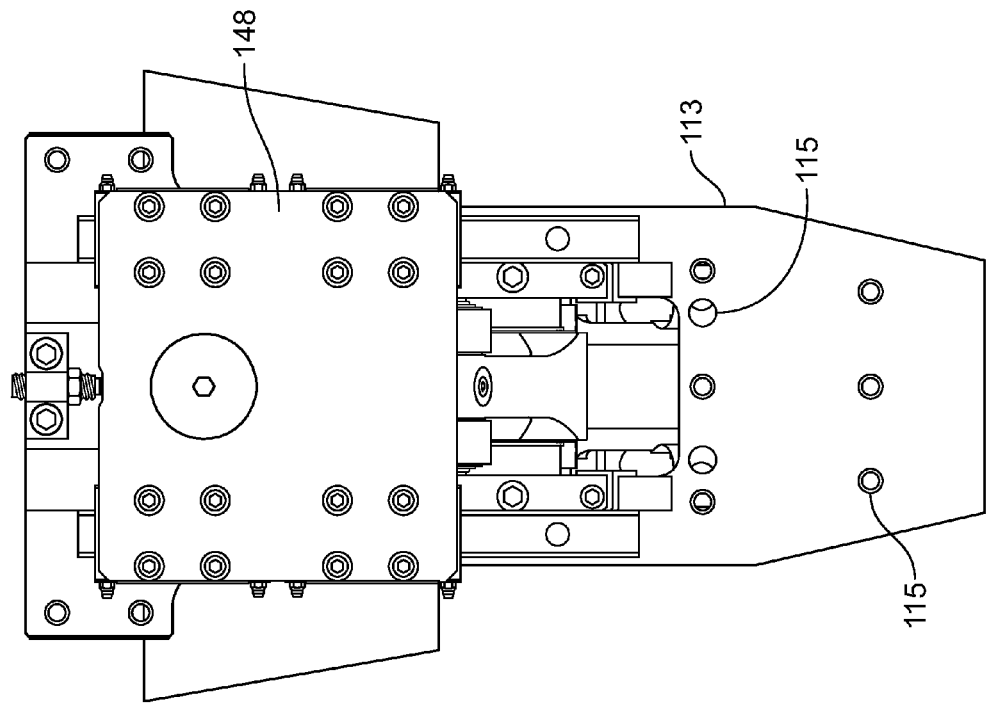
FIG. 10 is an end view of the modular mold clamp assembly of FIG. 3, as viewed from outside of the assembly.

With the mold halves 132 and 134 in the open position and drive 163 retracted as shown in FIG. 4, rotation of wheel 24 moves the open mold halves 132, 134 past the extrusion station to either side of a number of parisons extruded from an extrusion head. Rotation of the wheel 24 also moves follower 156 along a radially outward portion of a cam slot 196 (FIG. 15) to move follower slide 148 radially outwardly from the position of FIG. 4 to the position of FIG. 3. This movement rotates arm 144 counterclockwise from the position of FIG. 4 to the position of FIG. 3. Movement of the actuating means to affect such opening and closing movements of the mold die is achieved by mold-actuating cam means now to be described.

Figure 15:
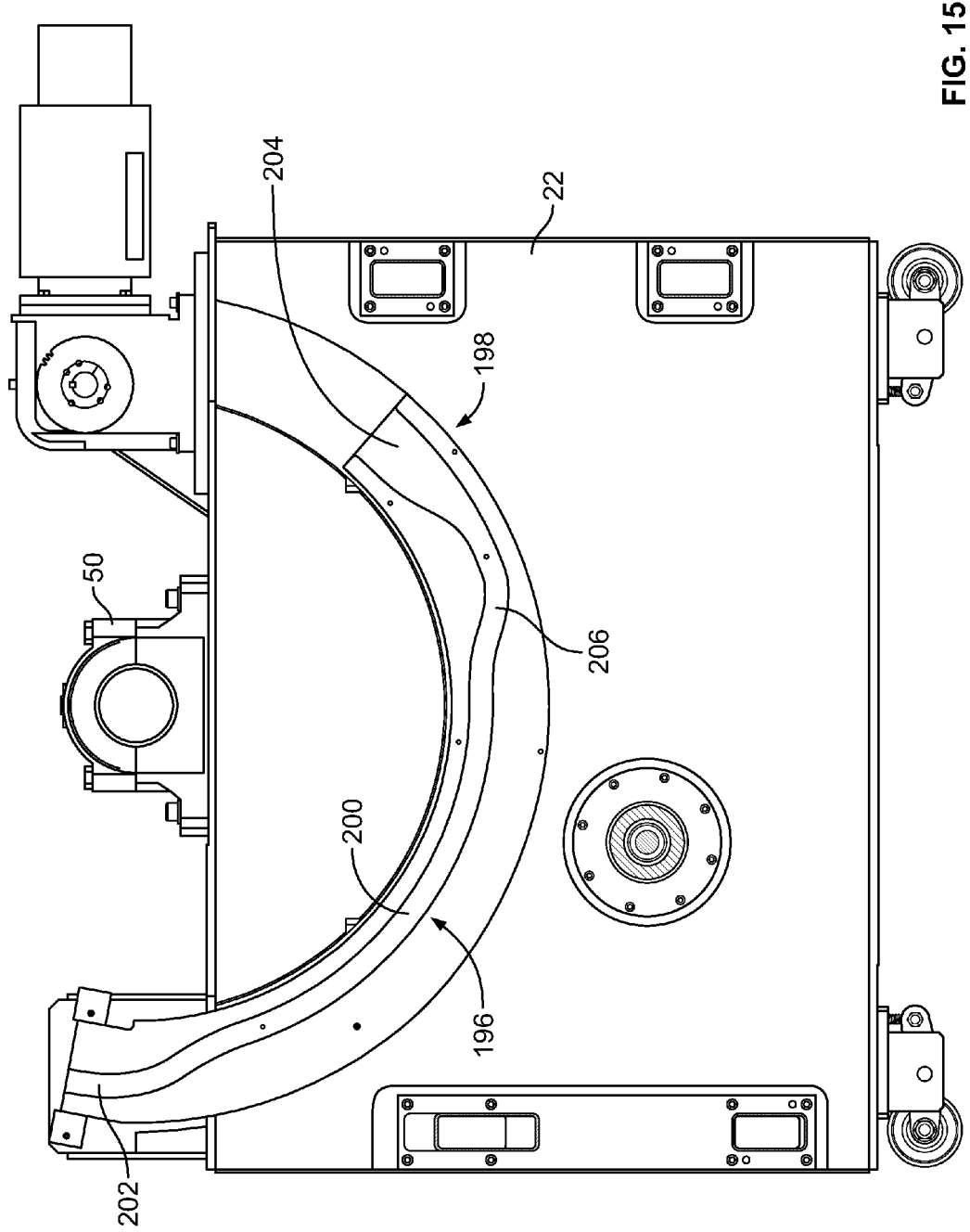
FIG. 15 is a large scale vertical elevation of a cam unit carried by the base of the blow molding machine.

Referring to FIG. 15, an exemplary cam unit 198 or assembly with cam slot 196 is illustrated. The cam unit 198 is positioned proximate a respective turntable 42 and is secured to the base 22. Cam unit 198 has the cam slot 196 formed in one face thereof. The slot 196 has a dwell portion 200 of substantial length and an actuating portion 202, which, when engaged by the cam followers 156, operates the mold clamp assemblies 100 to move the mold halves 132, 134 to closed position. The fully closed position thereof is effected when the cam followers are moved outwardly beyond the terminal end of the mold actuating portion 202 of the cam slot 196.

The outer or entrance end 204 of cam slot 196 is funnel-like and of appreciable width at the entrance end to insure the ready reception of cam followers 156 as they progressively move clockwise relative to the cam unit, as viewed in FIG. 15. The fully opened position is effected when the cam followers 156 are moved and engage a declining portion 206 of slot 196.

Rotation of arm 144 from the position of FIG. 4 to the position of FIG. 3 extends drive 163 to move shift member 162 away from end member 113. Movement of the shift member moves mold half 132 from the open position to the closed position. Movement of the shift member also actuates mold shift mechanism 165 to move shift rod 168 away from end member 113, rotate arm 172 and move mold half 134 from the open position to the closed position. The connection between rod 180 and spring pack 184 is adjusted so that spring pack 184 is compressed when the mold is closed.

During and after closing of the mold, the clamp force exerted on mold half 134 is transmitted directly to drive 163 through mechanism 165. An equal and oppositely-directed clamp force exerted on mold half 132 is transmitted to the drive directly through member 162. Clamping forces are transmitted through rods 124 between cross pins 170 and fixed pin 142 which in turn is attached to end frame 113. Clamping forces are not transmitted through frame member 110. The end of the mechanism 165, cross pin 170, adjacent end member 111 floats on the frame 110. As a result, the frame 110 is not subjected to bending moments by the high clamp forces holding mold halves 132 and 134 closed. The frame 110 need not be strengthened against bending moments. Smaller, more efficient motors may be used to operate the machine due to weight reduction.

After closing of the mold to capture the parison, rotation of wheel 24 moves the closed mold halves away from the extrusion station to a blow station where the parisons are blown, and, after cooling of the blown parisons, to an ejection station where the mold is opened for ejection of blow-molded containers. During rotation to the ejection station, follower 156 is moved radially inwardly by the cam track so that arm end 146 is moved radially inwardly about fixed pin 142, drive 163 is retracted as shown in FIG. 4, and the platens 126, 128 and mold halves 132, 134 are opened by movement of the shift member 162 and mechanism 165. Platen 126 and mold half 132 are connected directly to shift member 162 and are opened in response to movement of the member. Platen 128 and mold half 134 are opened by movement of shift rod 168 toward side member 113, which corresponds to rotation of arm 172 and movement of rod 180 away from side member 113 and toward side member 111.

During the operation of the wheel 24, it is not uncommon to have problems with a particular mold clamp assembly. It is also common to have scheduled maintenance. In the prior state of the art, in order to repair or perform maintenance on a particular mold clamp assembly, the operation of the wheel is stopped and the repair or maintenance is performed on the mold clamps as the mold clamps are attached to support rods of the wheel. This can cause significant downtime for the entire operation and dramatically affects the productivity of the operation. Alternatively, the operation of the wheel is stopped and the respective mold clamp is removed from the support rods and turntables of the wheel and replaced with another mold clamp assembly. However, as the mold clamp assemblies are attached at numerous points to the structure of the wheel, this process takes a good deal of time and expertise to accomplish, thereby dramatically affecting the productivity of the operation and requiring the services of a skilled operator to accomplish the transfer.

In contrast, the wheel 24 and the modular mold clamp assembly 100 described herein overcome the problems associated with the prior art. As all of the components of the modular mold clamp assembly 100 are mounted to the frame 110, the mold clamp assembly 100 is self-contained or modular, i.e., it is not mounted to integral support rods of the wheel. Therefore, the removal of the self-contained modular mold clamp assembly 100 from the wheel 24 is greatly facilitated. In order to repair or perform maintenance on a particular mold clamp assembly 100, the operation of the wheel 24 is stopped and the modular mold clamp assembly 100 is removed and replaced with another modular mold clamp assembly 100. As all of the components of the assembly 100 are pre-assembled and supported by the assembly frame 110, rather than by structural members of the wheel 24, the maintenance personnel simply unscrews the hardware which attaches the frame 110 of the modular mold clamp assembly 100 to the wheel 24, removes the modular mold clamp assembly 100, inserts a new modular mold clamp assembly 100, and attaches the frame 110 to the wheel 24 by use of the hardware. This allows the repair or maintenance to be accomplished with minimal downtime for the wheel, thereby minimizing the impact to the productivity of the operation. Additionally, the replacement of the modular mold clamp assembly 100 can be accomplished with maintenance level personnel rather than factory technicians, thereby minimizing the cost.

The method of molding parts in the blow molding apparatus 20 allows for productivity to be increased. The modular mold clamp assemblies 100 are inserted into the movable member 24. The movable member 24 is rotated about a rotational axis of the base 22. The components 42, 44 of the movable member 24 are supported through the modular clamp assemblies 100. The mold halves 132, 134, which are supported by the modular mold clamp assemblies 100, are clamped around extruded material. The material is cured in the mold halves 132, 134 and the parts are ejected from the mold halves 132, 134. This allows the productivity of the molding apparatus 20 to be increased, as the repair and maintenance downtime of the blow molding apparatus 20 is minimized.

The structure of the wheel 24 is also greatly simplified. As each modular member assembly 100 is self-contained, the various components of the modular mold clamp assembly 100 are not mounted to support rods, shafts or plates which extend between the turntables 42, 44 of the wheel 24. In addition, the base member 112 and the end members 111, 113 are made of materials that have the structural strength and integrity to act as supports when installed in the wheel 24. Therefore, the wheel 24 used with the modular mold clamp assemblies 100 described herein is greatly simplified from the wheels currently in use. The support rods and shafts previously required are eliminated, as the modular mold clamp assemblies 100 provide the structural support necessary between the turntables 42, 44 of the wheel 24.

As described herein, the modular mold clamp assemblies 100 provide the structure and rigidity between the turntables to help maintain the turntables in position relative to each other. This allows the wheel 24 of the blow molding machine to have more open spaces, making any repair to the blow molding machine easier. The use of the modular mold clamp assemblies 100 as supports also reduces the overall cost of the blow molding machine, as it is less expensive to have structural modular mold clamp assemblies than to have structural shafts upon which mold clamps are assembled.

While the base member 112 and end members 111, 113 must be made of material which has sufficient strength characteristics to support the components and provide the structural integrity required for the wheel 24, the frame 110 does not need to be made of material which can withstand the bending moments exerted by the high clamp forces holding molds 132 and 134 closed, as the bending moments are not transferred to the frame 110, as was previously described. Therefore, the frame 110 need not be strengthened against bending moments, thereby allowing the frame 110 to be made of relatively lightweight material. This facilitates the removal and replacement of the modular mold clamp assembly 100 and reduces the material costs to manufacture the frame 110. This also allows the turntables to be made of relatively lightweight material. As the bending moments are not transferred through the assemblies 100 to the turntables 42, 44, the turntables need not be strengthened against bending moments.

Depending upon the type of container to be manufactured using the blow molding machine, the number of molding stations may vary. Consequently, it is known in the art to have wheels with different numbers of mold stations. Currently, each of the wheels must be manufactured according to the desired application, with the appropriate number of shafts extending between the turntables to provide support to the turntables and to provide the mounting structure for the mold clamp assemblies. Consequently, as each wheel is designed for a particular number of mold stations, the inventory associated with meeting the needs of applications can be extensive.

According to the invention described herein, the inventory required to accommodate various configurations is minimized. As the wheels do not require support rods or continuous shafts, etc., the wheels can be manufactured to accommodate different configurations. An array of mounting openings 25 may be provided on the turntables 42, 44 of the wheels 24. The mounting openings 25 can be configured to accommodate multiple mold clamp assembly configurations. The modular mold clamp assemblies 100 may be used to accommodate various configurations of the wheel. The end members 111, 113 are positioned in line with the appropriate openings 25 of the turntables 42, 44 of the wheel 24 and mounted thereto using the mounting hardware. This allows the same modular mold clamp assemblies 100 to be used in various machines, thereby reducing the need to manufacture specific mold clamp assemblies for specific machines.

The modularity of the rotary blow molding machine reduces the cost of the machine. The turntables 42, 44 can be easily removed from the stub shafts 58, 60 by removing the mounting plate provided thereon. This allows the first respective turntables 42, 44 to be removed from the base 22 and ring gear 26 and replaced without the need to replace the ring gear 26, fluid manifold 210, air manifold 220, etc. As the shafts 58, 60 are not continuous, the turntables 42, 44 can be removed from the shafts 58, 60 by moving the turntables 42, 44 inward of the wheel. As the shaft 58, 60 is not continuous, the removal of the turntables does not require the removal of the shaft. Consequently, different sized turntables 42, 44 may be used without the need to change other parts of the rotary blow molding machine. In addition, the cam followers 156 may be positioned in different openings of the follower slide 148. This allows the cam followers 156 to be positioned at the same diameter, whether the mold clamp assemblies 100 to be used with turntables 42, 44 have a large diameter or small diameter. Consequently, the same mold clamp assemblies 100 can be used with large or small turntables. This allows the same components to be used in various machines, thereby reducing the need to manufacture specific components for specific machines. Only the different sized turntables 42, 44 would be changed.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A rotary molding machine comprising:
a base;
a movable member mounted for rotation on the base about a rotational axis, the movable member having a first component and a second component which is parallel to the first component, the first and second components extend transversely to the rotational axis;
a plurality of modular mold clamp assemblies positioned on the movable member, each modular mold clamp assembly being moveable between an open and a closed position, each modular mold clamp assembly having mounting areas which are mounted with respective mounting locations of the first and second components;
an array of mounting openings are provided in the mounting locations of the first and second components of the movable members, the mounting openings are configured to accommodate multiple mold clamp assembly configurations;
the modular mold clamp assemblies provide the structure and rigidity between the first and second components to help maintain the first and second components in position relative to each other.

2. The rotary molding machine as recited in claim 1, wherein a pair of shafts are positioned along the rotational axis of the movable member, a first shaft cooperates with the first component and a second shaft cooperates with the second component.

3. The rotary molding machine as recited in claim 2, wherein mounting hardware prevents the first and second components from inward axial movement and disengagement from respective shafts.

4. The rotary molding machine as recited in claim 1, wherein a drive gear is removably mounted to the movable member, the drive gear cooperating with a drive mechanism to rotate the movable member about the rotational axis.

5. The rotary molding machine as recited in claim 1, wherein a pair of shafts are positioned along the rotational axis of the movable member, the pair of shafts are tubular, outer ends of the pair of shafts being attached to rotary joints through which air and fluid respectively pass.

6. The rotary molding machine as recited in claim 1, wherein each modular mold clamp assembly has a frame having a base member, a first end member and an oppositely-facing second end member, the oppositely-facing first and second end members having the mounting areas provided thereon, first and second platens being movably mounted on the base member, the platens being movable between open and a closed position.

7. The rotary molding machine as recited in claim 1, wherein a respective component has a manifold for gaseous fluid removably attached thereto, the manifold transmits the gaseous fluid from a respective shaft to the modular mold clamp assembly.

8. The rotary molding machine as recited in claim 1, wherein a respective component has a manifold for liquid removably attached thereto, the manifold transmits the liquid from a respective shaft to the modular mold clamp assembly.

9. The rotary molding machine as recited in claim 1, wherein the modular mold clamp assemblies have cam followers which cooperate with a cam member provided in the base, the cam followers are movable between different openings of the modular mold clamp assembly to allow the cam followers to be positioned at the same diameter, whether the mold clamp assemblies are used with first and second components having a large diameter or a small diameter.

10. A rotary molding machine comprising:
   a base;
   a wheel mounted for rotation on the base about a rotational axis, the wheel having a first turntable and a second turntable which is parallel to the first turntable, the first and second turntables extend transversely to the rotational axis;
   a pair of shafts are positioned along the rotational axis of the wheel, a first shaft cooperates with the first turntable and a second shaft cooperates with the second turntable;
   a plurality of modular mold clamp assemblies positioned on the wheel, each modular mold clamp assembly being moveable between an open and a closed position, each modular mold clamp assembly having mounting areas which are mounted with respective mounting locations each turntable;
   the modular mold clamp assemblies provide the structure and rigidity between the turntables to help maintain the turntables in position relative to each other.

11. The rotary molding machine as recited in claim 10, wherein mounting hardware prevents the turntables from inward axial movement and disengagement from respective shafts.

12. The rotary molding machine as recited in claim 11, wherein a drive gear is removably mounted to the wheel, the drive gear cooperating with a drive mechanism to rotate the wheel about the rotational axis.

13. The rotary molding machine as recited in claim 11, wherein the first and second shafts are tubular and outer ends of the first and second shafts being attached to rotary joints through which air and fluid respectively pass.

14. The rotary molding machine as recited in claim 10, wherein each modular mold clamp assembly has a frame having a base member, a first end member and an oppositely-facing second end member, the oppositely-facing first and second end members having the mounting areas provided thereon, first and second platens being movably mounted on the base member, the platens being movable between open and a closed position.

15. The rotary molding machine as recited in claim 10, wherein an array of mounting openings are provided in the mounting locations of the first and second turntables of the wheels, the mounting openings are configured to accommodate multiple mold clamp assembly configurations.

16. The rotary molding machine as recited in claim 10, wherein the modular mold clamp assemblies have cam followers which cooperate with a cam member provided in the base, the cam followers are movable between different openings of the modular mold clamp assembly to allow the cam followers to be positioned at the same diameter, whether the mold clamp assemblies are used with turntables having a large diameter or a small diameter.

17. A wheel for use in rotary molding machine, the wheel comprising:
   a first turntable and a second turntable mounted for rotation about a rotational axis, the second turntable being parallel to the first turntable, the first and second turntables extend transversely to the rotational axis;
   a plurality of modular mold clamp assemblies, each modular mold clamp assembly being moveable between an open and a closed position, each modular mold clamp assembly having mounting areas which are mounted with respective mounting locations of each turntable;
   the modular mold clamp assemblies provide the structure and rigidity between the turntables to help maintain the turntables in position relative to each other;
   wherein as the modular mold clamp assemblies are moved to the closed position, the modular mold clamp assemblies do not transmit closing forces to the first and second turntables.

18. The wheel as recited in claim 17, wherein each modular mold clamp assembly has a frame having a base member, a first end member and an oppositely-facing second end member, the oppositely-facing first and second end members having the mounting areas provided thereon, first and second platens being movably mounted on the base member, the platens being movable between open and a closed position.

19. A rotary molding machine comprising:
   a base;
   a movable member mounted for rotation on the base about a rotational axis, the movable member having a first component and a second component which is parallel to the first component, the first and second components extend transversely to the rotational axis;
   a pair of shafts positioned along the rotational axis of the movable member, a first shaft cooperates with the first component and a second shaft cooperates with the second component;
   a plurality of modular mold clamp assemblies positioned on the movable member, each modular mold clamp assembly being moveable between an open and a closed position, each modular mold clamp assembly having mounting areas which are mounted with respective mounting locations of the first and second components;

the modular mold clamp assemblies provide the structure and rigidity between the first and second components to help maintain the first and second components in position relative to each other.

20. A rotary molding machine comprising:

a base;

a movable member mounted for rotation on the base about a rotational axis, the movable member having a first component and a second component which is parallel to the first component, the first and second components extend transversely to the rotational axis;

a pair of shafts positioned along the rotational axis of the movable member, outer ends of the pair of shafts being attached to rotary joints through which air and fluid pass;

a plurality of modular mold clamp assemblies positioned on the movable member, each modular mold clamp assembly being moveable between an open and a closed position, each modular mold clamp assembly having mounting areas which are mounted with respective mounting locations of the first and second components;

the modular mold clamp assemblies provide the structure and rigidity between the first and second components to help maintain the first and second components in position relative to each other.

21. A rotary molding machine comprising:

a base;

a movable member mounted for rotation on the base about a rotational axis, the movable member having a first component and a second component which is parallel to the first component, the first and second components extend transversely to the rotational axis;

a drive gear removably mounted to the movable member, the drive gear cooperating with a drive mechanism to rotate the movable member about the rotational axis;

a plurality of modular mold clamp assemblies positioned on the movable member, each modular mold clamp assembly being moveable between an open and a closed position, each modular mold clamp assembly having mounting areas which are mounted with respective mounting locations of the first and second components;

the modular mold clamp assemblies provide the structure and rigidity between the first and second components to help maintain the first and second components in position relative to each other.

* * * * *